United States Patent Office 2,859,124
Patented Nov. 4, 1958

2,859,124

MANUFACTURE OF LIGHT COLOURED ALUMINOUS CEMENT

George King, Birmingham, England, assignor, by mesne assignments, to Albright & Wilson (Mfg.) Limited, Oldbury, near Birmingham, England, a British company No Drawing. Application January 18, 1954
Serial No. 404,773

Claims priority, application Great Britain
January 19, 1953

13 Claims. (Cl. 106—104)

It is known that blast furnace and other industrial slags have been used in the manufacture of a material with hydraulic properties. In particular it has been proposed (German Patent 600,623 to W. Kyber, patented in 1925, published in 1934) to make a cement by grinding a slag produced at the same time as phosphorus, by a process in which carbon is heated with calcium phosphate mineral, and an aluminum-containing substance such as bauxite. It is further suggested in the Kyber patent that part or all of the bauxite might be replaced by a mineral aluminum phosphate.

It has also been stated (British Patent 393,799 to Panstwowa Fabryka Zwiazkow Azotowych W Chorzowie) that difficulties are encountered in the simultaneous production of phosphorus and slag cement in the electric furnace, in that large amounts of silica must be added in order to obtain a good yield of phosphorus, and this silica passes into the slag cement and impairs its value. The remedy suggested in B. P. 393,799 is to break the complete furnace process into two stages, in the first of which raw materials primarily favouring phosphorus production are used, and in the second stage other raw materials are added favourable to the production of high grade cement. The raw materials for the first stage are mineral phosphate (calcium phosphate), bauxite and coke, and for the second stage bauxite, lime or limestone and ferric oxide.

The slag cements with which we are concerned are those that can be obtained as a by-product from the manufacture of phosphorus by thermal or electrothermal methods. We refer to phosphorus furnaces without distinguishing between furnaces in which the source of heat may be the internal combustion of anthracite or coke (so-called phosphorus blast furnaces) or may be the passage of an electric current (so-called electrothermal furnaces). The slag cements with which we are concerned are, however, more particularly those that can be obtained from electrothermal phosphorus furnaces operating not less efficiently in respect of power consumption and ease of tapping and life of furnace lining than is customary at the present time when the slags produced are essentially calcium silicate. Calcium silicate slags compatible with good furnace operating conditions have no useful hydraulic cementing properties. As indicated above, an attempt was made as early as 1925 to achieve the object of simultaneous phosphorus production and cement production by partial substitution of calcium aluminate for calcium silicate. This process does not appear to have become a commercial success, and we believe that the reason is to be sought in a lack of understanding of the rather strict limitations on slag composition that we have found must be adhered to, as explained below. The proportion of alumina required to impart a useful degree of hydraulic cementing power to a phosphorus furnace slag is to some extent dependent upon the constituents other than CaO, $SiO_2$ and $Al_2O_3$, such as $TiO_2$, alkali metal oxides and MgO, but we do not find it possible to reduce the weight ratio of $Al_2O_3$ to CaO below 0.50. This ratio is much higher than in any cement normally referred to as Portland cement, and we shall use the term "high alumina cement" to describe the cements we are here interested in, which have a weight ratio of $Al_2O_3$ to CaO between 0.50 and 1.85. It is to be noted that British standard specification 915:1947 requires that high alumina cement shall contain not less than 32 percent by weight of $Al_2O_3$ and that the weight ratio of $Al_2O_3$ to CaO shall not be less than 0.85 nor more than 1.3. We are therefore not restricting our use of the term "high alumina cement" as narrowly as this particular definition.

We have now found that the fluorine present in most phosphate ores commonly used in the manufacture of phosphorus has an important influence on the hydraulic cementing properties of the powder made by grinding the slag to standard fineness. Aluminous slags having a fixed silica content, and a constant ratio of $Al_2O_3$ to CaO but with variable fluorine content, yield test bricks the strength of which varies with the fluorine content. For a given silica content the strength is usually greatest in the complete absence of fluorine, a condition which it is virtually impossible to achieve in practice. As the fluorine content is increased from zero the strength falls slightly to a minimum rising again to a broad maximum at a fluorine content which depends upon the silica content but which is normally about 2%. Beyond this maximum the strength decreases at first slowly and then more rapidly until it becomes too low for practical purposes. A cement, useful for at least some purposes is always obtainable at a fluorine content of less than 3.5% by weight with a silica content of less than 5% by weight and at a fluorine content of less than 2.5% by weight with a silica content of from 5% to 14% by weight. Although it is not normally necessary in practice it is possible when the fluorine content of the raw materials is abnormally low to avoid the aforesaid minimum by including an appropriate proportion of calcium fluoride or other fluorine containing material.

For example, starting with the natural bauxite from Demerara, British Guiana, slags were prepared by fusion with lime from Buxton, Derbyshire, with the addition in the melt of calcium fluoride. The ratio of $Al_2O_3$ to CaO in the slag (inclusive of CaO equivalent to the $CaF_2$) was fixed at 1.22, and the fluorine was varied from 0 to 4 percent. It is known that very rapid cooling of the molten slags must be avoided if it is desired to develop the cementitious value of a slag cement; in particular, if the slag is obtained in a glassy form by chilling it is of no value. The rate of cooling was the same in all cases and was satisfactorily slow (1600° to 1000° C. in 45 minutes and 1000° to 400° C. in 200 minutes) in these and other examples given later. The following tensile strength values were found for briquettes prepared according to British standard specification 12:1947:

| Weight percentage of fluorine in Slag | Tensile Strength, lbs. per sq. in. at 24 hours |
|---|---|
| 0 | 560 |
| 1.5 | 420 |
| 2.0 | 480 |
| 2.5 | 320 |
| 3.0 | 160 |
| 4.0 | 40 |

Indirect confirmation of the effect of fluorine was obtained by adding calcium fluoride to a commercial high alumina cement of alumina to lime ratio about 1.0 (Ciment Fondu), fusing and cooling slowly. Compared with a blank in which the same cement was fused and cooled without addition of calcium fluoride there was a decrease from 570 to 370 lb. per sq. inch tensile, the fluorine content of the original cement being 0.16 percent and of the treated cement 2.16 percent.

Commercial "high alumina" cements often contain a considerable proportion of combined silica, but it is generally considered that the proportion of silica that can be tolerated is dependent upon the proportion of iron present in an oxidised state. We have found that calcium aluminate slags low in fluorine content and free from iron rapidly fall in cementitious value when the percentage of silica is increased beyond about 10 percent. We have determined the following values of tensile strength for briquettes (3 sand: 1 cement) measured after 24 hours in the instrument described by British standard specification 12:1947. No calcium fluoride was added to the melts.

| Percent Silica | Tensile Strength in lbs. per sq. inch after 24 hours | | | | | | | |
| --- | --- | --- | --- | --- | --- | --- | --- | --- |
| | 3 | 4 | 7.4 | 7.8 | 9.0 | 9.5 | 12 | 15 |
| Source of Bauxite and Alumina: Lime ratio: | | | | | | | | |
| Demerara, $Al_2O_3$: $CaO=1:1$ | 524 | | | 608 | | 540 | 408 | 200 |
| Le Luc Var, $Al_2O_3$: $CaO=1.06:1$ | | 480 | 528 | | 500 | | 445 | 246 |

To be of practical value an aluminous cement should not have a lower tensile strength than the accepted value for rapid hardening Portland cement, namely 300 lb. per sq. inch after 24 hours. This means that aluminous slags from a phosphorus furnace must not have a silica content of more than 5% when the fluorine content is from 2.5% to 3.5% or more than 14% when the fluorine content is less than 2.5%. On the other hand no disadvantage attaches to the use of slags as low in silica as the available raw materials permit which in practice is about 3 percent by weight. We find that with aluminous slags low in silica, and having a ratio of alumina to lime within the limits 0.50 to 1.85, the cementitious value is very good; we also find that the working conditions of the phosphorus furnace are satisfactory in every respect in which they are affected by slag viscosity and slag electrical conductivity.

Accordingly the present invention provides a process for the production of high alumina material suitable for grinding to a high alumina cement as herein defined which comprises reducing a phosphorus-containing mineral mixture to form elemental phosphorus and a slag containing aluminum, calcium and up to 14% by weight of silica (i. e., up to 14% by weight of silicon calculated as $SiO_2$) and cooling the slag sufficiently slowly from the molten state to avoid obtaining the slag in a glassy form, the composition of the said mineral mixture being such that said slag has a weight ratio of alumina to lime (that is to say a weight ratio of aluminum to calcium calculated respectively as $Al_2O_3$ and $CaO$) of from 0.50 to 1.85 and contains less than 3.5% by weight of fluorine when the silica content is less than 5% by weight or less than 2.5% by weight of fluorine when the silica content is from 5% to 14% by weight.

We are primarily interested in phosphorus-furnace slags from which cements of strength not less than that of standard Portland cement can be made by fine grinding. In relation to this criterion we have found that high alumina slags containing up to 2 percent by weight fluorine; on the contrary, some high alumina slags from a phosphorous furnace, containing only slightly less than .2 percent of fluorine, have given tensile values as high as the best obtained anywhere in the range 0 percent to 2 percent of fluorine, and as high as the value obtained with the usual commercially available high alumina cement (Ciment Fondu). The marked deleterious effect of the fluorine is only apparent when more than 2 percent of fluorine is present.

We have further found, in accordance with a preferred feature of the present invention, that provided that the silica content of the slag is less than 5.0%, the cement obtainable there from yields test briquettes of remarkably high strength both in compression and in tension of fluorine are not rendered useless by the presence of the when the weight ratio of alumina to lime is at least 1.10. As the said ratio is increased beyond this figure the strength becomes even higher, maximum strength being exhibited at a ratio of from 1.30 to 1.60. A useful strength is exhibited at ratios greater than 1.60 but is accompanied by a rise in the fusion temperature of the slag and in order to avoid difficulties in tapping the furnace under manufacturing conditions, the ratio should not exceed 1.50. The preferred ratio accordingly lies within the critical range of from 1.30 to 1.50.

As will be appreciated the proportions of combined silicon, aluminum and fluorine which are required to be present in the mineral mixture to give the required proportions in the slag are readily determinable by experiment. It is relevant to the important matter of the fluorine content of the slags from a phosphorus furnace, that there is a partial elimination of fluorine during the operation of the furnace. The fluorine thus eliminated passes into the spray cooling water used to condense the phosphorus vapour. The proportion of the fluorine contained in the materials charged to the furnace that is eliminated in the furnace gases is somewhat variable but seldom lies outside the range one eighth to one quarter when the furnace charge is based on the substantially anhydrous naturally occurring calcium phosphates such as Florida phosphate or Moroccan phosphate. When these are mixed with bauxite to produce aluminous slags the loss of fluorine which automatically takes place in the furnace is not sufficient to reduce the fluorine content low enough to give a good cement. In order to obtain a slag with satisfactory cementitious properties, some process must be followed which ensures a fluorine content within the required limits. This can be achieved by a preliminary defluorination of the calcium phosphate mineral, according to known procedure, or by selection of ores which in their natural state are abnormally low in fluorine content. Alternatively, it is possible to select a naturally occurring aluminum phosphate or aluminum phosphate containing only a minor proportion of calcium phosphate, which is low in fluorine content, so that when mixed with the necessary proportion of fluorapatite to ensure a proper ratio of $Al_2O_3$ to $CaO$ the phosphorus furnace slag obtained contains less than 2.5 percent or 3.5 percent of fluorine as required. Aluminous phosphate ores in which the anion constituents include a substantial molecular proportion of hydroxyl, liberate water at an elevated temperature in the phosphorus furnace and apparently this water increases the degree of defluorination that occurs in the furnace.

Among the various possible methods of adjusting the fluorine content of the slag there may be mentioned the following:

(a) The phosphorus-containing mineral mixture may be formed from a naturally occurring aluminum phosphate of low fluorine content and a naturally occurring calcium phosphate in such relative proportions that the fluorine content of the slag is less than 2.5% or 3.5% as required.

(b) The phosphorus-containing mineral mixture may be formed from a naturally occurring aluminum calcium phosphate having a weight ratio of aluminum to calcium (calculated respectively as $AlPO_4$ and $Ca_3F_2O_8$) of at least unity and a naturally occurring calcium phosphate, in such relative proportions that the fluorine content of the slag is less than 2.5% or 3.5% as required.

(c) The phosphorus-containing mineral mixture may be formed from a naturally occurring calcium phosphate of low fluorine content and bauxite or alumina in such relative proportions that the fluorine content of the slag is less than 2.5% or 3.5% as required.

(d) The phosphorus-containing mineral mixture may be formed from defluorinated fluorapatite and bauxite or alumina in such relative proportions that the fluorine content of the slag is less than 2.5% or 3.5% as required.

The weight ratio of alumina to lime in the eventual slag is readily adjustable at the same time as the fluorine content by including in the initial phosphorus-containing mineral mixture appropriate proportions of phosphorus-containing and/or other mineral materials particularly oxides or carbonates relatively rich in aluminum or calcium as required.

To those skilled in the art there will be no difficulty in forming the appropriate phosphorus-containing mineral mixtures for use in the present process using phosphorus ores from the range of natural varieties thereof, sources of carbon for reduction such as coke, anthracite, and where required non-phosphorus-containing minerals rich in aluminum or calcium such as alumina, bauxite and limestone. Thus the high calcium-high alumina phosphates from Senegal (other than from Thies), the high alumina phosphate from Thies, the high alumina phosphates from the West Indies (e. g. from Redonda and Connetable) and the high calcium-low silica phosphates from Morocco and Uganda, the high calcium-high silica phosphates from Florida and M'Zaita and the high calcium silica-free phosphate from Nauru all represent useful compounding ingredients for use in the present invention, all that is necessary being that the composition of the phosphorus-containing mineral mixture is so arranged that the eventual slag has the required composition as indicated herein.

It is worthy of note that where a non-phosphorus containing mineral material rich in calcium is to be used, calcium oxide is preferred to limestone since the expulsion of carbon dioxide from the latter tends to increase the thermal requirement of the furnace.

A feature of slags made in phosphorus furnaces is that they have a low content of iron because substantially all the iron in the raw material introduced into the furnace is converted to iron phosphide and this forms a dense liquid layer readily separable from the molten slag. The greater part of the iron phosphide is recovered in the process of tapping the slag. A minor proportion may remain dispersed as minute globules throughout the slag, but this can be reduced to any desired extent by retaining the slag in a molten and quiescent state for a sufficient length of time. It is often an important advantage of slags intended for use as cement if the iron content is very low because the cement is then light in colour. The presence in the cement of a small proportion of iron in the form of iron phosphide is not very detrimental to the colour of the cement powder. Moreover, since iron phosphide is extraordinarily resistant to chemical change, no subsequent darkening occurs through oxidation or other forms of chemical attack.

From the economic standpoint it is likely that it will always be advantageous to operate phosphorus furnaces so that the highest practicable yield of elemental phosphorus is obtained. In practice the residual phosphorus (excluding any present as iron phosphide) in aluminous slags is comparable with that found in silicate slags, namely 0.2 to 1.2 percent calculated as phosphorus and as already stated, within these limits the value of the aluminous slag for conversion to a cement is not seriously affected, although it does appear that high residual phosphorus is a little detrimental.

Residual phosphate in the quantities normally present in a phosphorus furnace slag does not prevent the aluminous slag from giving a good cement, neither does it prevent the reduction in tensile strength caused by fluorine. Thus we heated a mixture of anthracite, pure dicalcium phosphate, $CaHPO_4$, with Buxton lime and Demerara bauxite, with and without added calcium fluoride. The slags had a ratio of $Al_2O_3$ to CaO close to 1.0, and the residual phosphate expressed as $P_2O_5$ was 2.2 percent. The slag without fluorine gave a test briquette with tensile strength of 490 lbs. per sq. inch whereas the slag containing 2.1 percent of fluorine gave a briquette with a tensile strength 370 lbs. per sq. inch.

Contrary to expectation, high alumina slags produced in an experimental phosphorus furnace are noticeably free from the smells associated with carbides or phosphides that are commonly observed with silicate slags from phosphorus furnaces. The practical importance of this is evident.

The following examples, in which all the proportions quoted are proportions by weight, are given by way of illustration of the invention and are not intended to limit the scope thereof.

*Example 1*

Mineral fluorapatite such as that mined in Florida (fluorine content 3.77 percent) was heated for 14 hours at 1000° C. in a current of steam to give a phosphate with fluorine content 0.44 percent (CaO 50.80%, $SiO_2$ 5.70%, $Fe_2O_3$ 0.75%, $P_2O_5$ 35.62%, $Al_2O_3$ 1.28%). 150 parts by weight of this defluorinated phosphate was mixed with 23.5 parts by weight of Demerara bauxite ($Al_2O_3$ 88%, $SiO_2$ 4.5%, $Fe_2O_3$ 3.0%, $TiO_2$ 3.5%) and with anthracite 27.3 parts, and heated in an electric furnace to produce slag and phosphorus. A similar charge but made with 150 parts by wight of normal apatite (F=3.77 percent) and 83.5 parts by weight of the same bauxite was heated in the same manner. Each of the slags was ground to a powder cement and used for making test bricks according to a standard procedure. The cement low in fluorine (0.3 percent F) gave a test briquette having 30 percent greater tensile strength than the other cement which contained 2.76 percent fluorine.

*Example 2*

69.44 parts of a mixture of calcium and aluminium phosphate mined in Senegal (W. Africa) (containing 0.68 percent fluorine, 7.97 percent CaO, 36.51 percent $Al_2O_3$, 29.4 percent $P_2O_5$), ignition loss 15.63 percent (due to hydroxyl content of the phosphate), was mixed with 30.56 parts of a phosphate mineral apatite 33.36 percent $P_2O_5$ (containing 50.49 percent CaO, 0.56 percent $Al_2O_3$, 3.28 percent fluorine) and 16.74 parts of anthracite, and heated in an electric furnace. The slag formed contained by analysis CaO 40.40 percent, $SiO_2$ 4.18 percent, $Al_2O_3$ 49.06 percent, fluorine 1.84 percent. It was ground to pass 170 mesh and the powder used to make test bricks which had a final tensile strength of 770 lbs. per square inch. Commercial high aluminous cement gave a brick, prepared and tested under the same conditions, breaking at 660 lbs. per square inch.

*Example 3*

73.2 parts of the same Senegal phosphate as used in Example 2, was mixed with anthracite and 26.8 parts of the same apatite as used in Example 3, and reduced in an electric furnace. The slag formed contained, by analysis, CaO 42.9%, $Al_2O_3$ 48.39%, $SiO_2$ 4.93%, $TiO_2$ 1.80%, F 1.61%, and $P_2O_5$ 0.46% and the alumina to lime ratio was therefore 1.13. The slag was cooled to a non-glassy solid and finely ground.

Test bricks showed a tensile strength after 3 days of 665 lb. per sq. in., and compression tests (British standard specification 915:1947) of 9,000 to 11,400 lb. per sq. in. X-Ray examination showed the main constituents as $CaO.Al_2O_3$.

*Example 4*

80 parts of the same Senegal phosphate as used in Example 2 was mixed with anthracite and 20 parts of limestone ($CaCO_3$ 97.6%, $SiO_2$ 1.1%) and heated as in Example 2 to give a slag containing, by analysis, CaO, 37.51%, Al$_2$O$_3$, 49.83%, SiO$_2$, 2.66%, F, 0.17%, TiO$_2$, 2.90% and P$_2$O$_5$, 0.29% and the alumina to lime ratio was therefore 1.33. The slag after cooling to a non-glassy solid was ground to pass a 170 mesh British standard sieve to give a cement which, mixed with sand in the standard manner in the ratio 3 sand to 1 of cement, gave a test brick having a tensile strength of 742 lb. per sq. in. after 3 days and a compression strength (British standard specification 915: 1947) of 13,600 lb. per sq. in. after 72 hrs.

*Example 5*

Similar proportions of Senegal phosphate and limestone as in Example 4 were heated with anthracite in a furnace in such a manner that the charge was fed continuously over long periods and the slag "tapped out" from time to time. The slag was cooled sufficiently slowly to avoid glass formation and finely ground. Analysis was as follows: CaO, 38.87%, Al$_2$O$_3$, 49.41%, SiO$_2$, 2.13%, F, 0.63%, TiO$_2$, 2.70%, P$_2$O$_5$, 1.00%. The alumina to lime ratio was 1.27. The tensile strength by standard test was 644 lb. per sq. in. in 1 day and the compression strength (British standard specification 915:1947) 14,000 lb. per sq. in. In 3 days the tensile strength was 759 lb. per sq. in. and compression strength 14,800 lb. per sq. in.

X-Ray examination showed that the main constituent was CaO.Al$_2$O$_3$.

*Example 6*

A mixture of Senegal phosphate 70%, limestone 30%, and anthracite were fed continuously to a continuous phosphorus furnace which immediately before had been working with a high silica phosphate from M'Zaita and which was not therefore completely free from this material. The slag was tapped-out from time to time and early samples analysed CaO 43.48%, Al$_2$O$_3$ 38.64%, SiO$_2$ 4.79%, TiO$_2$ 2.10%, F 0.31% and P$_2$O$_5$ 1.5% and therefore had an alumina to lime ratio of 0.89. The slag was cooled to a non-glassy solid and finely ground. Test bricks, tested as in the previous examples, showed an average compression strength of 8000 lb. per sq. in. and average tensile strengths of 315 lb. per sq. in. at 1 day, 354 lb. per sq. in. at 3 days and 402 lb. per sq. in. at 7 days.

*Example 7*

A slag analysing as follows was prepared by reducing a phosphorus-containing mineral mixture in a phosphorus furnace. CaO 38.87%, Al$_2$O$_3$ 49.41%, SiO$_2$ 2.13%, TiO$_2$ 2.7%, F, 0.17% and P$_2$O$_5$ 0.40%. The alumina to lime ratio was therefore 1.27.

The slag was cooled to a non-glassy solid and finely ground. Test bricks, tested as in the previous examples showed an average tensile strength of 797 lb. sq. in. at 1 day, 840 lb. per sq. in. at 3 days and 909 lbs. per sq. in. at 7 days.

In all of the foregoing examples a commercially satisfactory yield of elemental phosphorus was obtained as is evident from the low P$_2$O$_5$ analysis of the slag. Moreover a high alumina cement of commercially useful quality was always obtained. Thus in Example 6 a compression strength of 8000 lbs. per sq. in. and a seven-day tensile strength of 402 lbs. per sq. in. were obtained with an alumina to lime ratio of 0.89. Within the range of preferred alumina to lime ratios, the properties of the cement were strikingly improved reaching in Examples 4 and 5 well over 13,500 lbs. per sq. in. compression with over 740 lbs. per sq. in. in tensile and reaching as in Example 7 tensile strengths as high as 840 lbs. per sq. in. at 3 days and 909 lbs. per sq. in. at 7 days.

It will be appreciated that various departures may be made without departing from the scope of the invention from the detailed procedures described herein, which procedures are merely given by way of illustration and show how presently available starting materials may be employed. Changing world economic circumstances may affect the availability of many raw materials but it is not anticipated that those skilled in the art will, with the foregoing teaching available, experience any difficulty in determining which of the available materials are appropriate at a given time.

I claim:

1. A process for the production of elemental phosphorus and a high alumina cement consisting of the steps of compounding a phosphorus containing mineral mixture of naturally occurring fluorine containing aluminum phosphate and a naturally occurring calcium phosphate, at least one of which phosphates contains silica which on thermal reduction will produce a slag consisting essentially of alumina and lime with a weight ratio of from 0.50 to 1.85, and fluorine and silica, fluorine up to 3.5% by weight when having silica up to 5% by weight and fluorine up to 2.5% by weight when having silica up to 10% by weight, thermally reducing said mineral mixture in a furnace, withdrawing said slag in a molten state from the furnace during the reduction of said mixture, and cooling the molten slag sufficiently slowly to obtain a non-glassy material suitable for grinding to a high alumina cement.

2. In a process as claimed in claim 1 in which said mineral mixture contains iron, the added step of retaining the molten slag in a quiescent state for a time sufficient to allow separation of dispersed iron phosphide.

3. The process as claimed in claim 1 in which the phosphorus containing mineral mixture is compounded to produce a slag having an alumina to lime weight ratio of from 1.10 to 1.60 and having silica up to 5%.

4. A process as claimed in claim 3 in which the weight ratio of alumina to lime is from 1.30 to 1.60.

5. A process as claimed in claim 1 in which the phosphorus containing mineral mixture comprises naturally occurring aluminum phosphate of fluorine content less than 1% and a naturally occurring calcium phosphate.

6. A process as claimed in claim 1 in which the phosphorus containing mineral mixture comprises naturally occurring aluminum calcium phosphate having a weight ratio of aluminum to calcium of at least unity, the aluminum being calculated as AlPO$_4$ and the calcium being calculated as Ca$_3$P$_2$O$_8$, and a naturally occurring calcium phosphate.

7. A process as claimed in claim 1 in which the phosphorus containing mineral mixture comprises a naturally occurring calcium phosphate of fluorine content less than 1% and bauxite.

8. A process as claimed in claim 1 in which the phosphorus containing mineral mixture comprises fluoroapatite and bauxite.

9. A process as claimed in claim 1 in which said slag contains fluorine up to 2% by weight.

10. A process as claimed in claim 1 in which the phosphorus containing mineral mixture comprises a calcium containing compound which during the reduction will produce a slag having a weight ratio of alumina to lime of from 1.10 to 1.60.

11. A high alumina cement consisting essentially of silicon calculated as SiO$_2$ up to 5%, fluorine up to 3.5% and aluminum calculated as Al$_2$O$_3$ and calcium calculated as CaO in a weight ratio of from 1.10 to 1.60.

12. A high alumina cement as claimed in claim 11 in which the weight ratio of aluminum to calcium is from 1.30 to 1.60.

13. A high alumina cement as claimed in claim 11 containing fluorine up to 2%.

References Cited in the file of this patent

UNITED STATES PATENTS 1,000,290   Peacock _____ Aug. 8, 1911

(Other references on following page)

UNITED STATES PATENTS

| | | |
|---|---|---|
| 1,677,182 | Hasselbach | July 17, 1928 |
| 1,716,527 | Martin | June 11, 1929 |
| 1,758,241 | Suchy | May 13, 1930 |
| 1,789,197 | Seailles et al. | Jan. 13, 1931 |
| 2,791,103 | Meyers | Feb. 3, 1931 |
| 2,391,493 | Wainer et al. | Dec. 25, 1945 |
| 2,407,135 | Clark | Sept. 3, 1946 |
| 2,479,389 | Maust et al. | Aug. 16, 1949 |

FOREIGN PATENTS

| | | |
|---|---|---|
| 287,036 | Great Britain | Mar. 15, 1928 |
| 632,164 | Great Britain | Nov. 17, 1949 |